June 5, 1928. 1,672,736
B. C. SKINNER
METHOD AND APPARATUS FOR APPLYING PARAFFIN FOR THE PRESERVING OF FRUIT
Filed Feb. 1, 1922
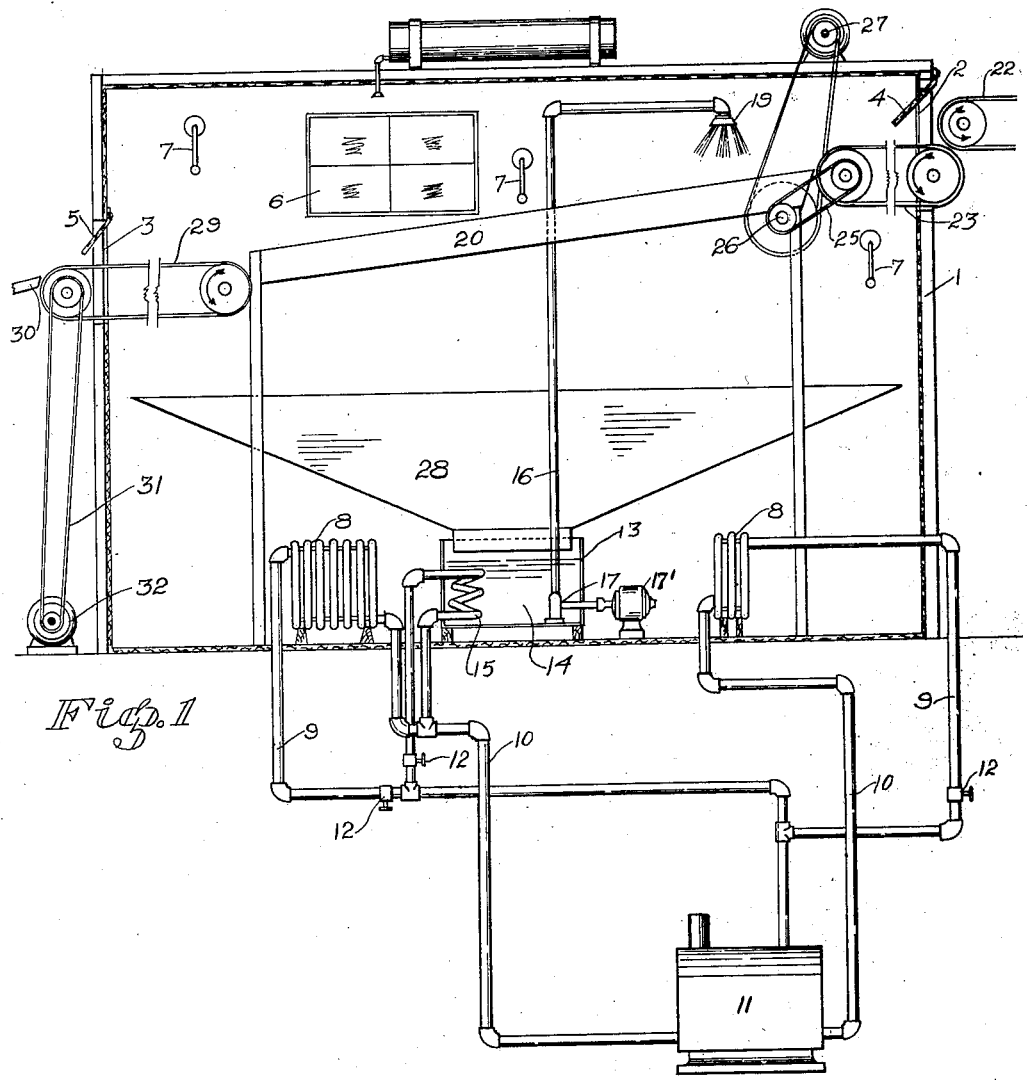
Fig. 1
Fig. 2
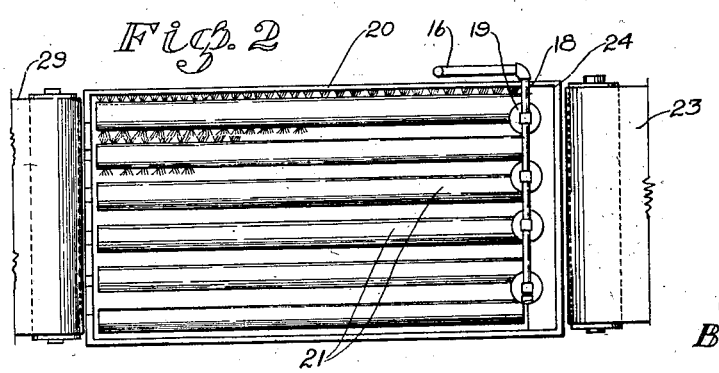
Inventor
Bronson C. Skinner
By Acker & Tollen
Attorneys Patented June 5, 1928.

1,672,736

UNITED STATES PATENT OFFICE.

BRONSON C. SKINNER, OF DUNEDIN, FLORIDA, ASSIGNOR TO THE BROGDEX COMPANY, OF WINTERHAVEN, FLORIDA, A CORPORATION OF FLORIDA.

METHOD AND APPARATUS FOR APPLYING PARAFFIN FOR THE PRESERVING OF FRUIT.

Application filed February 1, 1922. Serial No. 533,485.

It has been discovered that citrus fruits, particularly oranges, are largely prevented from shriveling and consequently preserved for a considerable time after the packing thereof if a film or coating of paraffin is applied to the surface to exclude the greater portion of the air therefrom.

It has also been discovered that if a polish is imparted to the fruit after the application of this preservative coating, a more ready sale is found for the highly polished fruit, and in some instances a greater price is obtained therefor as compared to fruit of corresponding size and quality but untreated with preservative and unpolished.

This invention relates to a method of preserving and polishing fruit by applying to its surface, preferably after the surface of the fruit has been heated to a degree above atmospheric, a fluid body of preservative, preferably melted paraffin, while the fruit is in an atmosphere maintained at a temperature sufficiently high to prevent hardening of the paraffin, and maintaining the fruit within such warm atmosphere for a period of time sufficient to enable the coating operation to be properly effected. This period of time should not be long enough, however, to permit substantial internal heating of the fruit to take place since such internal heating would be likely to damage the fruit.

This invention further relates to the above mentioned method, wherein the fruit, during the time it is exposed to the relatively high temperature, and after receiving its application of melted paraffin, is subjected to a brushing action for imparting a polish to the fruit surface prior to discharging the same from the locality or zone of high temperature, the polishing action distributing the paraffin evenly over the surface of the fruit to insure the complete enveloping of the fruit within an extremely thin coating of preserving medium.

In carrying out the method of my invention, any suitable form of apparatus may be employed for performing the various steps thereof, but one form that has given satisfactory results is shown, by way of illustrative example, in the accompanying drawings wherein—

Figure 1 is a diagrammatic view of said apparatus, and

Figure 2 is a view in detail plan of the polishing brushes.

In the drawing illustrating the apparatus, the numeral 1 indicates a housing, casing or chamber provided with a fruit inlet opening or door 2 and a fruit outlet opening or door 3, the door 2 being maintained substantially closed by the inwardly swinging closure flap or member 4, and a member 5 similar to the member 4 is positioned within the opening 3.

To observe the operation of the method, a window 6 is preferably provided in the side wall of the member 1, and to observe from the exterior of the chamber the temperature at different levels within the member 1, thermometers 7, preferably three in number, are provided at different levels of the interior of the chamber 1. To maintain the interior of the chamber at a temperature sufficiently high, approximately 149 degrees Fahrenheit in a typical instance, to maintain the paraffin in a melted flowing condition, there are provided radiators 8, connected with each of which is a steam inlet pipe 9 and a return pipe 10, said pipes 9 and 10 being connected with a heat generator 11, and the pipes 9 being provided with controlling valves 12. The radiators 8 are located at spaced points within the base of the chamber 1 preferably adjacent opposite ends thereof. Within the chamber 1 is positioned a receptacle 13 for containing a body of melted paraffin 14, the paraffin being maintained melted by a heating coil 15 connected at its opposite ends to the respective pipes 9 and 10. The melted paraffin is pumped from the chamber 13 upwardly through a pipe 16 by the action of a pump 17 driven by a motor 17'. The pipe 16 at its upper end connects with a lateral 18 mounting spray heads 19 which are positioned transversely above the receiving end of a suitable polishing apparatus 20 of the well known type, preferably embodying parallel spaced rotatably mounted polishing brushes 21 inclined downwardly from the end nearest the opening 2 toward the end nearest the opening 3 in the wall of the chamber 1. The fruit to be preserved is delivered to the opening 2 by an endless conveying belt 22, and is discharged on to an endless preheating belt 23 extending a sufficient distance within the casing 1 to give sufficient time for the fruit conveyed on the upper flight thereof from the opening 2 to the point of its discharge on to the polisher 20 to become superficially heated so that the surface temperature thereof will not be low enough to immediately chill the paraffin coating when applied thereto in a melted condition. The endless belt 23 moves in the direction of the arrow, Figure 1, and discharges on to the feed end 24 of the polishing apparatus 20, said conveyor being driven by a belt 25 from a shaft 26, which shaft has intergeared connection, not shown, with the rotating brushes 21. The shaft 26 is driven at the desired speed by a motor 27.

By my present method, it will be observed that the conveying belt 23 in the movement of the fruit from the opening 2 to the receiving end of the polishing apparatus 20 enables the surface of the fruit to become warmed by the relatively high temperature within the chamber 1, but although this heating action is rapid, the operating conditions are so adjusted and controlled that the interior of the fruit is not heated and only the exterior is materially raised in temperature so as not to immediately chill the paraffin applied thereto. As the fruit is delivered from the conveyer 23 to the upper ends of the brushes 21, it receives a quantity of paraffin preferably sprayed thereon from the heads 19. This paraffin, due to the brushing action and the tossing and rolling of the fruit in its travel downwardly in the runways between the brushes 21, causes the paraffin to be distributed in an even thin film over the surface of the fruit and to be polished by the action of the brushes. The thin film of paraffin forming a coating on the fruit sufficiently excludes the air therefrom, largely prevents the evaporation of oil contained within the skin cells, and precludes to a great extent the shriveling of the fruit for a considerable length of time, and the polishing presents the fruit to the customer in a cleaner and more attractive manner, enabling the merchant and consequently the grower and producer each to obtain a better price for their fruit. The excess paraffin which may be deposited on the fruit, or brushed therefrom by the action of brushes 21, is maintained in fluent condition by reason of the temperature prevailing in the chamber 1, and returns to the chamber or sump 13 by way of a catch pan or trough 28 positioned beneath the polishing apparatus 20 and discharging into the member 13. The paraffined and polished fruit passing from the polisher rolls or brushes 21 is delivered upon an endless discharge belt 29, and is conveyed beneath the flap or door 5 through the opening 3 on to a discharge chute or other means 30. The belt 29 is operated through a driving connection 31 from a motor 32.

By maintaining the temperature of the chamber 1 sufficiently high to melt the paraffin, or at a temperature only slightly if at all below the melting point of paraffin, the excess paraffin, or that removed from the fruit during the polishing thereof, and that deposited on the brushes by the members 19, when there is no fruit below the same, remains liquid or sufficiently fluid to readily return to the sump 13 for future use, and prevents the clogging of the apparatus by the collecting and solidifying of the paraffin on the inner walls of the chamber and on the mechanism thereof.

While in the specification I have referred to the preservative as paraffin, it is understood that any other form of preservative may be employed which would be capable of being polished. The temperature of the chamber 1 depends on the preservative employed as the temperature of this chamber is preferably maintained at a degree sufficient to melt the preservative and thus to permit that adhering to the different parts of the machine to return to the sump or catch pan, and it may be found desirable to employ beeswax as a preservative and polishing film in place of paraffin.

I claim:—

1. The method of preserving fruit which consists in raising the temperature of the surface of the fruit above atmospheric, applying thereto melted paraffin, and polishing the fruit with its applied coating while the surface of the fruit is warm.

2. The method of preserving fruit which consists in heating the surface of the fruit to a temperature above atmospheric, applying a coating of paraffin thereto in an environment maintained at a temperature sufficient to maintain paraffin in a melted state, and polishing the fruit so treated in a paraffin melting temperature.

3. The method of preserving fruit which consists in passing the same through a relatively closed heated chamber, maintaining within the chamber a body of melted paraffin, applying the paraffin to the fruit at a point within the chamber sufficiently removed from the point of admission of the fruit to permit the fruit surface to become heated by the chamber temperature before the paraffin is applied.

4. The method of preserving fruit which consists in passing the same through a relatively closed heated chamber, maintaining within the chamber a body of melted paraffin, applying the paraffin to the fruit at a point within the chamber sufficiently removed from the point of admission of the fruit to permit the fruit surface to become heated by the chamber temperature before the paraffin is applied, and subjecting the paraffined fruit to a brushing action to impart a polish to the surface thereof.

5. The method of preserving fruit which consists in passing the same through a relatively closed heated chamber, maintaining within the chamber a body of melted paraffin, applying the paraffin to the fruit at a point within the chamber sufficiently removed from the point of admission of the fruit to permit the fruit surface to become heated by the chamber temperature before the paraffin is applied, and subjecting the paraffined fruit to the action of a polishing member for imparting a polish to the paraffined surface thereof.

6. The method of preserving fruit which consists in passing the same through a relatively closed heated chamber, maintaining within the chamber a body of preservative in a melted condition, applying to the fruit surface a coating of preservative after the surface of the fruit has become warm, distributing the preservative over the surface of the fruit in a thin film and removing the excess preservative from the surface of the fruit by subjecting the fruit to the action of polishing elements, the excess preservative returning to the main body of preservative.

7. The method of treating fruit, which consists in raising the temperature of the surface of the fruit above atmospheric, then applying thereto paraffin, and polishing the fruit with its applied coating while said surface is warm.

8. The method of preserving fresh fruit which comprises superficially preheating the fruit, and applying and rubbing over the warmed surface thereof a normally substantially solid preservative material which is fluid at the temperature of preheating, until the fruit is provided with a film-like coating of said material.

9. The method of preserving fresh fruit which comprises superficially preheating the fruit to a temperature at which paraffin will not congeal thereon, applying paraffin in fluent condition to the warmed surface of the fruit, and rubbing the fruit to distribute the paraffin thereover in a thin protective film.

10. The method of preserving fresh fruit which comprises superficially preheating the fruit to a temperature at which paraffin will not congeal thereon, applying paraffin in fluent condition to the warmed surface of the fruit, and subjecting the fruit thus treated to the rubbing and polishing action of rotary brushes to obtain a uniform and very thin protective film on the fruit.

11. Apparatus for treating fruit comprising the combination, with polishing apparatus, of spray means mounted to direct fluid material into contact with fruit on said apparatus, a housing enclosing the foregoing parts, and heating means for maintaining the interior of said housing at a temperature above atmospheric.

12. The process of enhancing the keeping qualities of fruit having a waxy skin which comprises heating the fruit, and then applying a surface film of waxy material to delay the drying out of the fruit.

13. The method of preserving fruit which consists in raising the temperature of the surface of the fruit above atmospheric, applying thereto melted wax, and polishing the fruit with its applied coating while the surface of the fruit is warm.

14. Fruit treating apparatus comprising the combination with a conveyor device, of fruit-polishing mechanism to which fruit is delivered from said conveyor device, means cooperating with said polishing mechanism to apply coating material to fruit, and means for heating fruit while on said conveyor device.

In testimony whereof I have signed my name to this specification.

BRONSON C. SKINNER.